J. A. Reed,
Oscillating Steam Engine.
Nº 12,216.          Patented Jan. 9, 1855.
Fig. 1
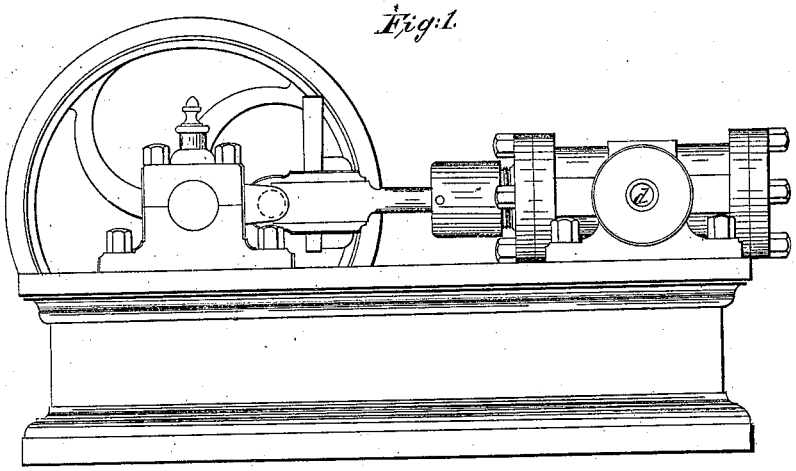
Fig. 2    Fig. 4    Fig. 3
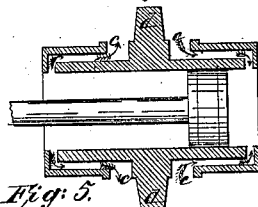 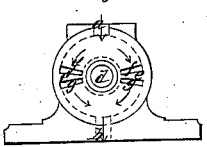 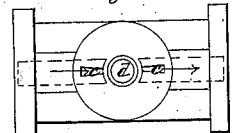
Fig. 5    Fig. 8    Fig. 6
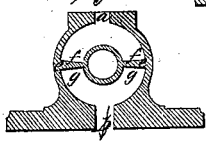 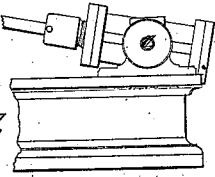 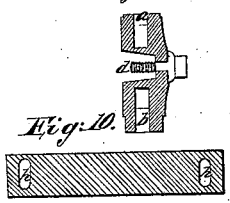
Fig. 7    Fig. 10
Witnesses:          Inventor:
S. S. Staples          John A. Reed
Leonard W. Goddard

UNITED STATES PATENT OFFICE.

JOHN A. REED, OF NEW YORK, N. Y.

OSCILLATING ENGINE.

Specification of Letters Patent No. 12,216, dated January 9, 1855.

*To all whom it may concern:*

Be it known that I, JOHN A. REED, of the city, county, and State of New York, have invented and reduced to practice certain Improvements upon the Oscillating Steam-Engine Providing a Better Mode of Introducing the Steam into the Cylinder and for Its Escape, and when my improvements are applied I denominate the engine an "Antifriction Oscillating Engine."

The method I have devised for the introduction and escape of the steam is much more simple than any heretofore used, within my knowledge, and saves much friction and much expense in construction and use of the engine.

To carry into effect my discovery and improvements I make ports and valves on both sides of the common oscillating cylinder, through which the steam enters the cylinder on both sides at the same time and from points opposite each other and thus the steam counteracts and balances itself and prevents the friction which is occasioned by taking in the steam on one side only at a time.

An engine with a cylinder with my improvements for the induction and the eduction of steam I denominate an antifriction oscillating engine.

The trunions on which the cylinder oscillates are made conical and tapering from the cylinder with a screw in the end of each trunion to tighten the valve and compensate for the wearing by the friction, should the friction, in its bearings render it necessary. To allow the valve and steam chest to be moved nearer to the valve seat on the cylinder, when necessary to prevent the waste of steam, make the holes to receive the bolts to secure the steam chest and valve in their place in the form of a slot.

The drawings which accompany and make part of this specification will fully explain my improvements and show how they are made.

Figure 1 is an external view of the cylinder in its bearings; Fig. 8 is the same showing the cylinder a little elevated at the end where the piston enters; Fig. 2 is a sectional view of the cylinder cut through the center horizontally; Fig. 3, view of the valve seat, its ports and position; Fig. 4, view of the face of the valve with its openings; Fig. 5, view of the chambers in the valve with the partitions; Fig. 6, a sectional vertical view of the valve with trunnion and set screw; Fig. 7 shows the bed plate, and Fig. 7a the same on a smaller scale; Fig. 9, the balance wheel, crank and bearings showing the connection with the piston rod and connecting the engine with the machinery to be worked. Fig. 10 is a view of the base of the valve or steam chest showing the holes or slots $h$, $h$, therein to allow the valve, or steam chest to be adjusted to the seat on the cylinder.

Further explanations of the drawings by the letters.

Letter $a$, the induction pipe; letters $f$ $f$, the opening in the valve through which the steam passes from the ports of the cylinder; letters $g$ $g$, openings through which the steam passes from the ports of the cylinder; letter $b$, the opening through which the steam escapes; letters $c$ $c$, are the ports in the valve seat; letters $d$ $d$, trunnions with the set screw; letters $e$ $e$, partitions in the chambers of the valves.

I do not claim any of the parts of the oscillating steam engine as my original invention—nor any of the parts of said engine by me employed to carry out and effect my said improvements, as my invention, independently of their connection in the combination specified but

What I claim as my invention and improvement on the oscillating steam engine is—

1. The arranging and placing the valves and steam ports on each side of the cylinder, and in combination therewith, so as to let the steam in on both sides of the cylinder at the same time, at opposite points, so as that the steam from opposite points may meet in the cylinder and so balance the pressure as to prevent that severe friction which is occasioned by letting the steam in on one side only of the cylinder at a time.

2. I further claim the trunnion bearing made adjustable to the trunnion by the set screws, and so arranged that the conical trunions may be accurately adapted to the conical seat, as herein set forth.

New York, Nov. 28, 1854.

JOHN A. REED.

In presence of—
LEONARD W. GODDARD,
S. P. STAPLES.